Jan. 25, 1938.   A. G. ENOCK   2,106,210
MECHANISM FOR RAISING BOTTLES ONTO THE TABLE
OF A BOTTLE FILLING AND CAPPING MACHINE
Filed Oct. 12, 1935   3 Sheets-Sheet 1

INVENTOR
A. G. Enock

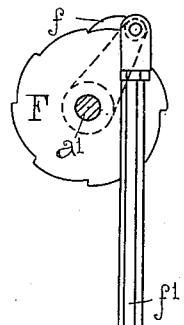
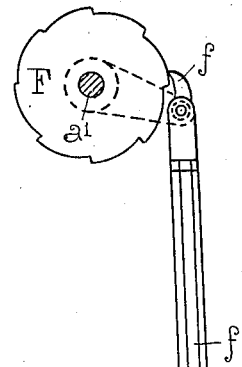
Fig. 3.
Fig. 4.
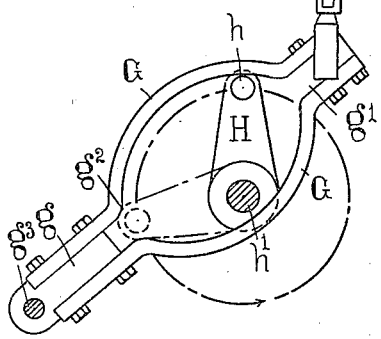
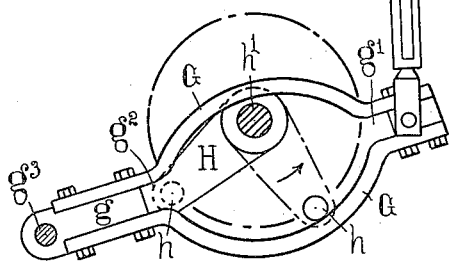
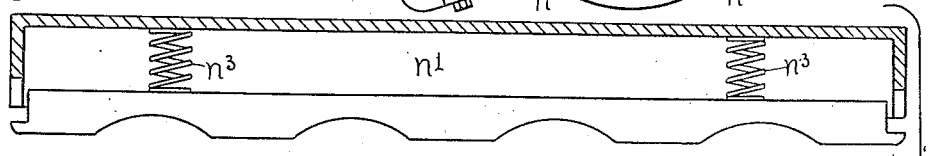
N
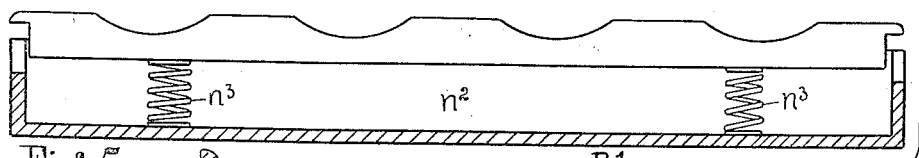
Fig. 5.
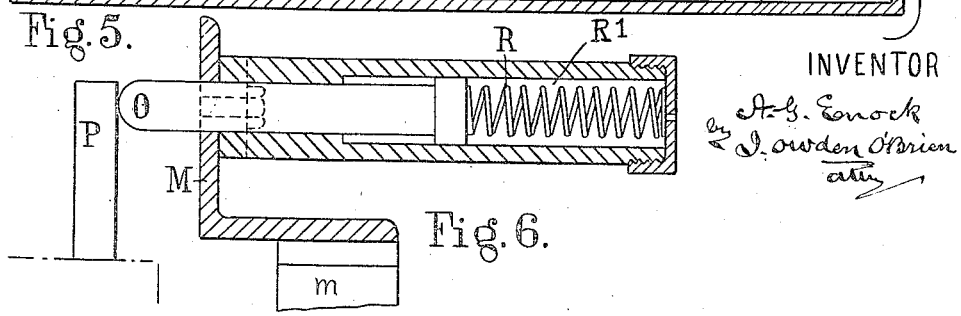
Fig. 6.
INVENTOR Patented Jan. 25, 1938

2,106,210

UNITED STATES PATENT OFFICE 2,106,210

MECHANISM FOR RAISING BOTTLES ONTO THE TABLE OF A BOTTLE FILLING AND CAPPING MACHINE

Arthur Guy Enock, Wembley Park, England

Application October 12, 1935, Serial No. 44,650
In Great Britain October 20, 1934

7 Claims. (Cl. 226—94)

The invention relates to mechanism for raising bottles onto the table of a bottle filling and capping machine.

One object of the invention is to provide means for the transfer of bottles of varying size from the carrying chains onto the filling and capping table.

A further object is to provide means for the transfer of bottles of varying sizes from the off-loading end of carrying chain onto the filling and capping table which will steady the delivery bar and centre the bottles correctly under the filling valves and capping heads.

The invention comprises a chute down which the bottles slide as they leave the bottle carriers, a curved receiving plate, a swinging pushing bar to push the bottles up the receiving plate onto the filling and capping table, and a centering appliance to bring the bottles in succession under the filling valves and capping heads.

The invention will be fully described with reference to the accompanying drawings:—

Fig. 3 is a side elevation of the intermittent traversing motion at the top of its forward movement.

Fig. 4 is a side elevation of the intermittent traversing motion at the bottom of its reverse movement.

Fig. 5 is an enlarged detail of centering appliance.

Fig. 6 is an enlarged detail of steadying appliance for the pushing bar.

Figure 1:
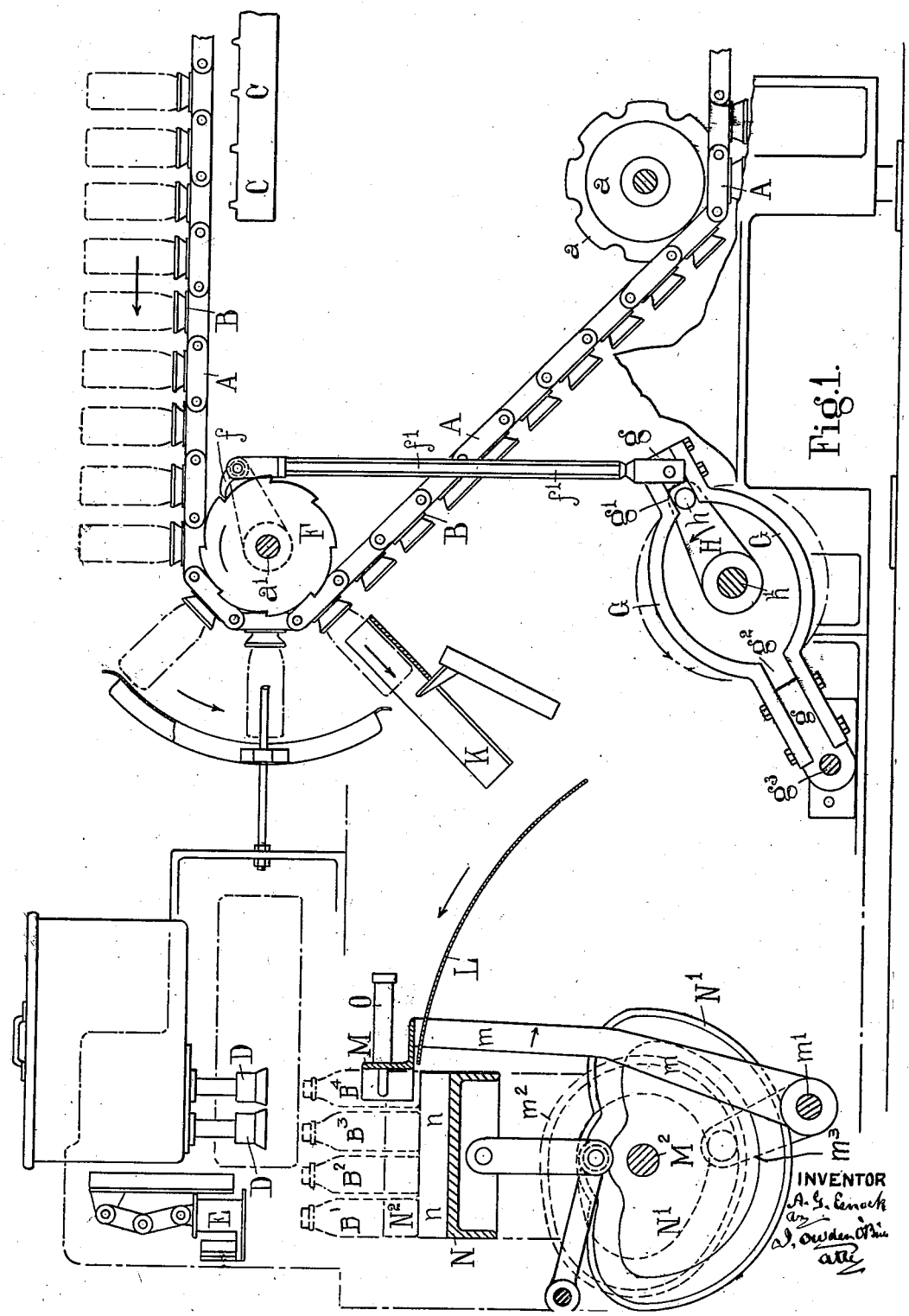
Fig. 1 is a side elevation partly in section of the operative end of the machine partly in section.
Figure 2:
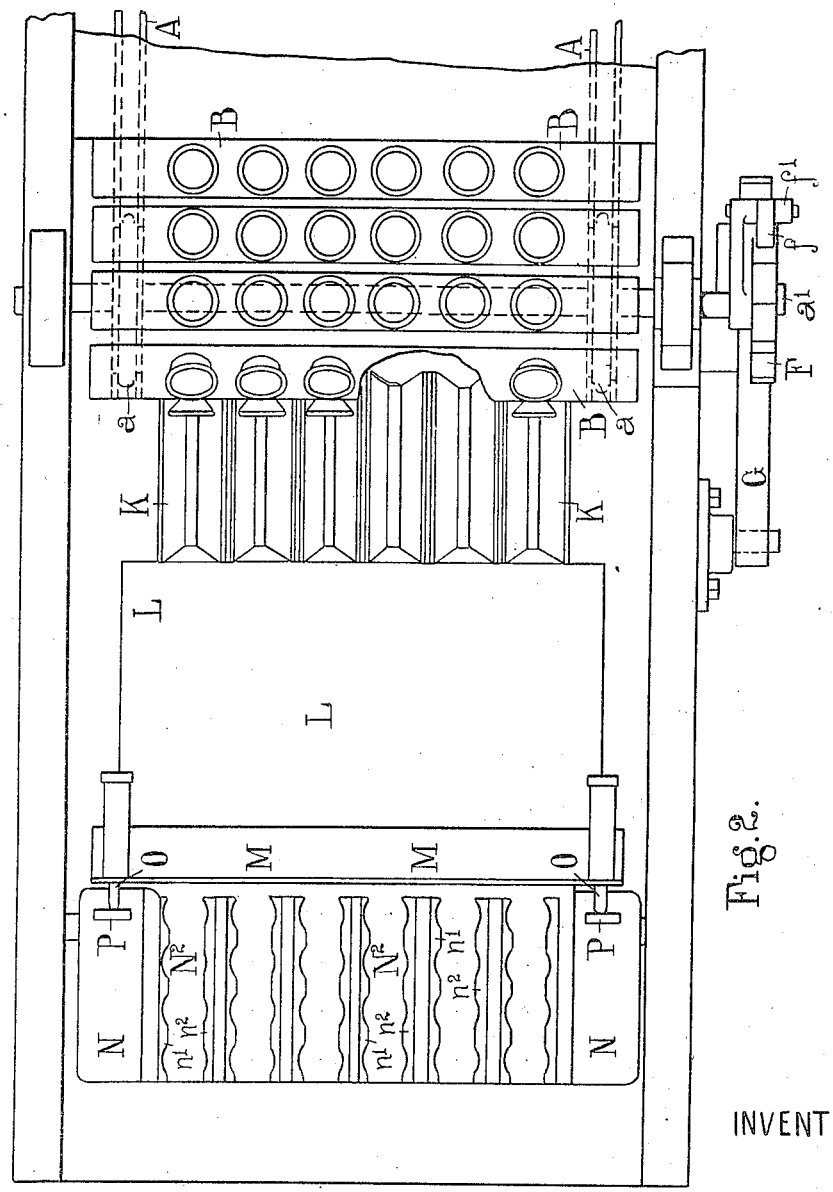
Fig. 2 is a part plan.

The machine is constructed with traversing chains A mounted on sprocket wheels $a$ on shaft $a'$, transverse bottle baskets or carriers B affixed thereto, a plurality of water jets C disposed below the bottle baskets B, bottle filling nozzles D and capping heads E of known construction.

A ratchet wheel F is secured on the shaft $a'$ and operated by a pawl $f$ on the rod $f^1$. The rod $f^1$ is pivoted at its lower end to a pair of curved links G bolted together and spaced apart by blocks $g$ to form an ellipse with a radial slot $g^1$ at one end and a similar slot $g^2$ at the other end. The links G are pivoted on a fixed stud $g^3$ on which they are free to oscillate and a rotary crank H with a crank pin $h$ is mounted on a shaft $h^1$. The crank pin $h$ revolves within the elliptical path between the links G and engages the slots $g$, $g^1$ at either end. At the commencement of each forward stroke the crank pin $h$ is in the slot $g^1$ and as the crank H rotates the pin $h$ drives the links G upwards and with them the pawl rod $f^1$ thereby rotating the ratchet wheel F and traversing the bottle chains A. The forward movement of the pawl $f$ of the ratchet wheel F continues so long as the crank pin $h$ remains in the slot $g^1$ but when it has risen to the point where it leaves the slot, the links G and rod $f^1$ come to rest and the traverse is arrested. The crank pin $h$ now bears upon the upper elliptical face of the link G until it engages the slot $g^2$ at the other end and reverses the movement of the rod $f^1$ thus bringing back the pawl $f$ for the next stroke. The pin $h$ now bears upon the under elliptical face of the link G and the pawl and ratchet remain stationary until the pin $h$ again engages the slot $g^1$ for the next stroke when the cycle is again repeated. By this means is secured a long standing or dwell period and a short but swift forward traverse of the chains A.

A chute K is fitted at the delivery end of the machine down which the bottles slide as the chains move forward and the bottles leave the bottle baskets or carriers B and come to rest upon the curved receiving plate L.

A push bar M carried on oscillating arms $m$ is mounted to traverse over the plate L and push the bottles onto the capping and filling table N.

As the bottles reach the table N a buffer or steadying appliance O comes into operation to act as a shock absorber and ensure a steady delivery of the bottle. The buffer O is affixed to the ends of the arms M and as these arms approach the end of their stroke the buffer O comes in contact with a stop P as shown in Fig. 6 and air is compressed and ejected from the chamber at $R^1$ at the same time as the spring R is compressed.

The arms $m$ are mounted on a shaft $m^1$ rocked by a cam $m^2$ through links $m^3$ forming bell crank levers. The cam $m^2$ is keyed on a shaft $M^2$.

The filling and capping table N onto which the bottles are pushed by the push bar M is raised and lowered by the cam $N^1$ also keyed on the shaft $M^2$ to bring the bottles into contact with the filling nozzles D and capping heads E. After each rise the bottles are pushed forward the distance of one bottle by the push bar M as an additional bottle is pushed up the inclined curved plate L. The bottles are thus pushed successively under the filling nozzles D and capping heads E.

To accommodate bottles of differing heights and enable them to be filled and capped with their mouths at the same level a making up piece $n$ is fitted on the top of the table N. For large bottles the curved plate L may be lowered to bring it level with the top of the table N.

The centres of the valves D and capping heads E are such as to accommodate bottles of the larger diameter as they are pushed forward one at a time. To accommodate bottles of lesser diameter a centering device $N^2$ is employed on the table N comprising two parts $n^1$ $n^2$ pressed together by springs $n^3$ and shaped with recesses to receive the bottles. Thus where small bottles are being employed as shown in Fig. 1 the pusher bar M at each stroke pushes the new bottle into contact with the last bottle $B^4$ which in turn is pushed against the adjacent bottle $B^3$ and so on. On the return stroke of the pusher bar M the pressure of the recessed faces of the centering device on the sides of the bottles in turn centres the first remaining bottle $B^4$ which pushes succeeding bottles forward during the centering operation.

The centering device next centres a bottle $B^3$ in the same manner which moves succeeding bottles forward during the operation and so on until bottle $B^1$ has been centred. Two sets of filling valves or nozzles D are provided whereby in the case of bottles of large capacity, a bottle comes first under one valve or nozzle and is partly filled and then under the next valve or nozzle where it is completely filled and then under the capping or discing head E where it is sealed.

What I claim as my invention and desire to protect by Letters Patent is:—

1. Mechanism for raising bottles onto the table of a bottle filling and capping machine comprising a receiving plate, a push bar adapted to reciprocate over the receiving plate, a bell crank lever to impart movement to the push bar, a shock absorbing buffer mounted on the bell crank lever and a stop on the table against which the buffer comes in contact to take up any play in the push bar as it approaches the end of its forward stroke.

2. Mechanism for raising bottles onto the table of a bottle filling and capping machine comprising an inclined curved receiving plate, a push bar adapted to reciprocate over the receiving plate, a bell crank lever to impart movement to the push bar, an air buffer mounted on the bell crank lever and a stop on the table against which the buffer comes in contact to take up any play in the push bar as it approaches the end of its forward stroke.

3. Mechanism for raising bottles onto the table of a bottle filling and capping machine comprising an inclined curved receiving plate, a push bar adapted to reciprocate over the receiving plate, a bell crank lever to impart movement to the push bar, an air buffer mounted on the bell crank lever, a stop on the table against which the buffer comes in contact to take up any play in the push bar as it approaches the end of its forward stroke, and a centering appliance to automatically adjust the position of the bottles on the table.

4. Mechanism for raising bottles onto the table of a bottle filling and capping machine comprising an inclined curved receiving plate, a push bar adapted to reciprocate over the receiving plate, a bell crank lever to impart movement to the push bar, an air buffer mounted on the bell crank lever, a stop on the table against which the buffer comes into contact to take up any play in the push bar as it approaches the end of its forward stroke, a centering appliance to automatically adjust the position of the bottles on the table and a making up piece on the table to compensate for bottles of differing heights.

5. Mechanism for raising bottles onto the table of a bottle filling and capping machine comprising an inclined curved receiving plate, a push bar adapted to reciprocate over the receiving plate, a bell crank lever to impart movement to the push bar, an air buffer mounted on the bell crank lever, a stop on the table against which the buffer comes in contact to take up any play in the push bar as it approaches the end of its forward stroke and mechanism for intermittently feeding forward a bottle onto the inclined receiving plate.

6. Mechanism for raising bottles onto the table of a bottle filling and capping machine comprising an inclined curved receiving plate, a push bar adapted to reciprocate over the receiving plate, a bell crank lever to impart movement to the push bar, an air buffer mounted onto the bell crank lever, a stop on the table against which the buffer comes in contact to take up any play in the push bar as it approaches the end of its forward stroke, mechanism for intermittently feeding forward a bottle onto the inclined receiving plate and a chute down which the bottles slide onto the plate.

7. Mechanism for raising bottles onto the table of a bottle filling and capping machine as in claim 1 in combination with intermittent mechanism for delivering the bottles onto the receiving plate.

ARTHUR GUY ENOCK.